Patented May 11, 1937

2,080,077

UNITED STATES PATENT OFFICE 2,080,077

MOLDED PRODUCTS AND PROCESS OF MAKING SAME

Guy C. Howard and Lloyd T. Sandborn, Wausau, Wis., assignors to Masonite Corporation, Laurel, Miss., a corporation of Delaware No Drawing. Application January 26, 1935, Serial No. 3,646

24 Claims. (Cl. 18—55)

This invention relates to plastic molding materials, molded products and process of making same, and particularly to such products made from fibrous ligno-cellulose substance forming the principal part of trees and woody annual and perennial plants. The invention affords a simple and inexpensive mode of making valuable plastic materials and molded products out of material which is widely available at low cost or as waste of other industries.

The principal object of the invention is the production, from such fibrous ligno-cellulose substance alone, of a hard, strong, permanent product which in its best embodiment is vitreous-like in appearance, of dark brown to black coloration, practically amorphous in the sense of being practically free from readily discernible fiber structure, and which approaches the ultimate density (about 1.5 specific gravity) of ligno-cellulose substance, and can be submerged in water for a day or more with but little water absorption or loss of strength.

A further object consists in the production of molding composition materials by simple and inexpensive treatment with heat and water of a raw material containing such fibrous ligno-cellulose substance, which materials alone, save for only a small percentage of a plasticizer, supply the components needed for securing what we shall call the resin-effect and filler-effect in our molding compositions, it being found necessary to have such effects properly balanced in order to obtain products with the desired properties, and also yield water-resistant products, and which molding composition materials are so easily compressible that resort to excessive molding pressure is not necessary, and, with a controlled percentage of plasticizer, such as 1–11% of water plasticizer, retained during the molding operation, these materials can be readily molded at moderate temperatures and at pressures ordinarily made use of in molding practice into products having high density and other valuable characteristics as set forth in stating the principal object of the invention.

Other objects will appear from the following description of the embodiments of the invention.

In the manufacture of hard fiber boards from coarse ligno-cellulose fiber produced by exploding wood chips with steam in a "gun" such as described in patent to W. H. Mason No. 1,824,221, solid fine material amounting to about five to eight per cent of the total weight of the fiber is discarded and sent to waste in order to avoid causing surface defects in the product, thereby segregating the solid fines from the coarse fiber. A quantity of these segregated and ordinarily discarded solid fines and a quantity of the coarse ligno-cellulose fiber, used in the manufacture of the hard fiber boards, were obtained. It was discovered that such waste solid fines material, alone and with nothing else except a small percentage of water, can be molded at moderate temperatures, as for example 175 degrees C., and moderate pressures commonly used in molding operations, as for example 2000 lb. per square inch, into valuable products of about 1.35 or 1.45 specific gravity and having other properties as already set forth in stating the objects of the invention. Reference is made later on to the coarse gun fiber being tried for molding.

In the manufacture of said coarse ligno-cellulose fiber (wherewith the solid fines are incidentally produced) representative practice consisted in admitting steam gradually into a gun chamber filled with wood chips until the pressure reached 375 pounds per square inch (230° C.) which took about thirty seconds, following immediately by bringing the steam pressure up to 1000 pounds per square inch (285° C.) in about three or four seconds, whereupon the outlet to a region of lower, usually atmospheric, pressure was opened and explosive discharge of the material into principally coarse fiber ensued, due to expansion of steam which had penetrated the chips. The small proportion of solid fines incidentally produced and adapted for molding as stated, apparently consists partly of short broken pieces of fibers and partly of ligno-cellulose substance broken down into substantially non-fibrous state, and these fines were apparently produced from some portions of the chips being more completely subjected to and altered by the exposure to steam in the gun than other portions of the chips which were exploded into the coarse fiber material desired for making the hard board.

The observation that, apart from mere mechanical disintegration by pressure release, the heat and water treatment in the gun had produced alteration in the case of the solid fines making them suitable for molding into such products as described led applicants into the endeavor to determine conditions which would enable the same or like results to be obtained at lower temperature and pressure conditions. The subject matter of the present application thus falls into two parts; first, the original discovery of the moldability of such solid fines, and the new product thereby obtained; and second, how results of the same general character can be obtained at lower temperatures and pressures. In expressions, used in our claims, such as heat treatment in presence of water, and the like, the word water is used generically to include the fluid phases of this substance, namely steam and/or liquid water. Several of the claims herein are related to claims in the companion application of Mason et al., Serial No. 3640, filed on even date herewith, as genus to species.

The following may be stated as a general outline of procedure, including features some of which may be at times omitted or replaced by others. Fibrous ligno-cellulose material is provided in somewhat subdivided state. It is then heated in the presence of water, under conditions adapted to alter the fiber structure, so that it becomes more friable and more readily compressible and such heat treatment is so controlled as to secure a desired relationship between the resin-effect and filler-effect properties of the treated material, since such relationship is found to be of importance in accomplishing the purposes of the invention. By this treatment, a portion of the ligno-cellulose substance is converted into materials soluble in water, and these are preferably removed at least in part, as by draining and washing. Before or after such removal, the treated material is preferably reduced to a state of fineness best suited to the molding requirements, dried and the moisture content adjusted to about 1% to 11%, which is found necessary for successful molding, and finally molded under moderate temperatures as about 120 degrees C. to 200 degrees C., and at ordinary pressures as about 2000 lb. per square inch, and the result is the production of molded products having the valuable properties described in stating the objects of the invention. No added resins, fillers, or waterproofing agents are needed, all such functions being served by the ligno-cellulose material, when treated in accordance with our teaching herein.

The fibrous ligno-cellulose starting material, which may be secured from trees and various woody annual or perennial plants, is reduced to a state of relatively coarse subdivision, being preferably chipped or hogged into small pieces, which are preferably screened to uniform size, or same may be in the form of sawdust or other readily available fragment sizes. The fibrous ligno-cellulose starting material must contain a sufficient portion of the fiber encrusting substances containing lignin to impart high waterproofness and permanent strength to the molded product. Preferably the material taken for treatment is raw wood which is the most readily available source of the fibrous ligno-cellulose substance and contains (together with the cellulose) all of the lignin and other natural non-cellulose matter, i. e., constituents other than cellulose. Cellulose fiber made by chemical digestion, such as soda pulp, for example, from which the non-cellulose constituents have been removed, is not adapted for the purposes of the invention, since products made from such fiber are readily penetrated and weakened by water.

The treatment with heat and water must be under complete control, in order to accomplish the necessary alterations in the ligno-cellulose material for the purposes of this invention. Such treatment consists in controlled heating of the ligno-cellulose material in the presence of water, and the practical absence of air and other gases. The specific conditions of treatment depend on the ligno-cellulose material used, its physical size and condition, the extent of the alteration desired, and other factors. The requirements are to effect such alterations as will convert the ligno-cellulose material into a condition having a proper relationship between its resin-effect and filler-effect properties to permit of its being molded into products having the stated characteristics and controlling the conditions of the heat and water treatment is found necessary for the accomplishment of this. Such control can be accomplished in various ways, and in general consist in regulating the time, temperature, pressure and hydrogen-ion concentration (pH) conditions of the treatment.

For example, the desired alteration can be accomplished to a useful extent by heating the ligno-cellulose material in liquid water at atmospheric pressure and a temperature of about 100 degrees C. for several hours. The range of permissible time of treatment under such conditions within which the desired alteration can be accomplished is wider than at higher temperatures, but is still limited. The rate and extent of the alteration will vary with the pH conditions, a longer time being required under slightly acid conditions, for example pH 6.0, than under more acid conditions, for example pH 4.0.

Or the desired alteration can be accomplished in a shorter time by heating the ligno-cellulose material in either liquid water or steam in an autoclave under steam pressure, for example two hours or less at 120 pounds steam pressure (176° C.). At this higher temperature, the range of permissible time of treatment within which the desired alteration can be accomplished will be narrower than under the lower temperature of the foregoing example. The pH conditions will likewise influence the rate and extent of the alteration.

The desired alteration was accomplished in still shorter time at the higher temperatures used when the solid fines material above referred to was formed.

One effect of the heat and water treatment is to partially hydrolize the material to convert a portion of the ligno-cellulose substances into water soluble forms thus permitting their removal in whole or in part, by washing out prior to the molding operation, which is of advantage in securing increased water resistance and wet strength in the molded product. Such water soluble matter is preferably removed completely or at least very substantially reduced in amount, by leaching preferably with hot water, settling, filtering, and if desired, pressing the resultant solid material.

In addition the heat and water treatment effects structural alterations in the nature of a partial breaking down or weakening of the structure of the ligno-cellulose substance, as evidenced by its becoming more friable and less tough thus permitting easier grinding or pulverizing, and becoming more easily compressible to a high density in the presence of a plasticizing agent.

Since ligno-cellulose may be regarded as made up largely of lignin, cellulose and hemi-cellulose constituents, and of these constituents the hemi-cellulose is most readily altered to water soluble forms by heating in the presence of water, the water insoluble material resulting from the heat and water treatment represents a material reduced in hemi-cellulose constituents in comparison with its original composition. In addition, through our controlling the extent of the alterations effected by the heat and water treatment, this water insoluble material is in a condition embodying the desired relationship between its resin-effect and filler-effect properties found necessary to give practical moldability at ordinary molding temperatures and pressures, and to yield molded products having the characteristic properties enumerated under the objects of the invention.

The material prepared as described can be used alone, save for a small amount of water or other suitable plasticizer, as a complete molding composition. When so used, it is dried and mechanically ground to the desired condition and preferably screened as through a 60 mesh screen to give more uniform results in the subsequent molding operation. Molded articles having the characteristic properties already described can be made directly from this material alone, save for a small amount of water or other suitable plasticizer, but without any auxiliary bonding or filler or waterproofing constituents. The treated ligno-cellulose material thus provides at minimum cost the constituents for giving the so-called resin effect ordinarily contributed by resins separately supplied, and for giving the so-called filler effect ordinarily contributed by wood flour or other fillers separately supplied, and also for giving high water-resistance and high dry-and-wet strength to the molded product.

However, if desired, our molding composition materials can be mixed with resins, fillers, pigments and other materials such as are ordinarily used in the molding art, to form molding compounds.

For successful molding, and in order to assure that a particular product can be duplicated when desired, our molding composition materials require the presence of a plasticizing agent in controlled amounts within the percentage range stated. Water functions as such plasticizing agent and is preferably used.

To control the water content the material can be dried and remoistened to the desired degree or the drying can be stopped at the desired water content. In general, best results are gotten by using the minimum amount of water which will produce a product having the several properties described in stating the objects of the invention, the molding being carried out under sufficiently confined conditions to avoid excessive escape of the plasticizing agent by volatilizing during the molding operation. On the one hand, at least 1% of water as a plasticizer is ordinarily necessary as a minimum. If any of said molding composition materials is dried completely and the completely dried material subjected in a mold to the same heat and pressure conditions (which with sufficient water present would give a satisfactory molded product with about 1.35 to 1.45 specific gravity) it exhibits little or no plasticity and flow and gives pieces relatively lacking in density, as for example around 1.15 specific gravity, retaining substantially the original color, and retaining more or less the original fibrous appearance, and such pieces take up water and lose strength rapidly. (It should be noted, however, that when a completely dried composition is molded at high temperature, for example above 200° C. or for a long time, for example, 30 minutes, some water can form during the molding and function to plasticize the composition.) On the other hand it is not practical to use over about 11% of water as the plasticizer because of too high plastic flow and consequent necessity of holding the molding pressure unduly low and because too high moisture in the composition gives products with inferior properties, as regards strength, water resistance, shrinkage, warping, etc. The water content for the best results as regards moldability and the properties of the molded product vary with different ligno-cellulose materials used, with the particular heat and water treatment, and with other conditions. For example, in molding the solid fines already referred to, about 4 to 6% of water is preferred, as will appear from the following tabulation of the data showing the effect of varying the water content when molding the solid fines for ten minutes at a pressure of 2000 lb. per square inch at 176° C.

| No. | Percent of water in molding composition | Sp. gr. of product | Percent water absorbed | Modulus of rupture pounds per sq. inch | |
|---|---|---|---|---|---|
| | | | | Dry | Wet |
| 1 | Approximately zero | 1.16 | 43.0 | 2200 | 600 |
| 2 | 3.6 | 1.42 | 1.6 | 6800 | 6000 |
| 3 | 3.8 | 1.41 | 1.1 | 6500 | 6200 |
| 4 | 4 | 1.44 | 0.8 | 7250 | 7200 |
| 5 | 5.5 | 1.44 | 1.0 | 6000 | 5700 |
| 6 | 6.1 | 1.45 | 0.5 | 5100 | 4800 |
| 7 | 6.6 | 1.42 | 0.7 | 4800 | 4000 |
| 8 | 10 | 1.42 | 1.0 | 3800 | 3500 |

(In the above and later tables the modulus of rupture dry was determined on the piece after it had been allowed to stand at room temperature for 24 hours after molding. The modulus of rupture wet was determined on the piece dried in air at room temperature for 24 hours after it had been immersed for 24 hours in water. Water absorption is the amount of water absorbed in 24 hours immersion in water. Samples tested were ¾" x 1½" x 6" in size.)

The greater the water content is at the time of molding over the optimum water requirements the lower the strength of the finished piece will be, but this strength can be brought up to some extent at least by baking of the molded piece after it has been taken out of the mold; and in general, while water (or equivalent plasticizer) is required in molding, it can be at least partially driven out of the finished molded products afterwards by baking, with no injury and usually with production of increased strength.

Other plasticizers such as alcohol, for example, can be used in whole or in part instead of water.

In molding this ligno-cellulose product, especially into thin pieces, it can be removed without chilling from the mold without its blistering by carefully controlling the temperature, but a wider range of molding conditions can be used if the mold is chilled before removing the product. The best range of temperatures for molding practice is about from 120° C. to 200° C., and the best range of pressures from about 1000 pounds to 3000 pounds per square inch.

The pressures to be used are dependent on numerous variables including the particular starting material used, the plasticizer content of the molding composition, the time of heat and water treatment originally given, the shapes to be molded and the type of molding used, and on the presence of other materials, such as lubricants, etc. For example, the solid fines containing as much as 10% of water can be molded at a pressure as low as 1000 pounds per sq. in., whereas with 4% of water a pressure of 2000 pounds per sq. in. is better.

When any of the molding composition materials is molded under suitable heat and pressure with a proper amount of water present, it changes in the molding operation to a dense, uniform molded product. Fractured edges of molded pieces have an amorphous appearance with little or no readily discernible fiber structure. A plastic flow or fluxing action in the mold is indicated by several effects which are produced when the molding operation is successfully performed. The material flows into mold spaces provided for its reception in closed or pressure molds, where the "draw" is not too extreme, and a fine finish is obtained, with accurate reproduction of the mold surfaces and polish. The product turns from previous light brown color to dark brown or black. The product made from the solid fines when molded is black and this fact, coupled with its hardness and density, makes it closely resemble black "Bakelite" molded products. While a sawed edge or broken edge will show brown in color, it becomes black if rubbed smooth with sandpaper. The products are highly resistant to water, and of a density approaching the ultimate density of ligno-cellulose substance, the density obtained being to some extent, independent of the particular pressure used. The best molded products may be soaked in cold water for a week without absorbing more than about 1% to 3% of water, or if boiled in water for one hour about the same amount of water will be taken up, with practically no resulting loss in strength in either case.

The molded products are quite strong, their modulus of rupture normally ranging from about 5000 pounds per square inch to about 8000 pounds per square inch, and will vary with baking and other treatments after molding.

Molded products made as described are well adapted for general molded product uses by their good appearance, strength, hardness and density, water resistance, resistance to acids, dielectric strength and their low material and manufacturing costs.

The following table illustrates the preparation and test data for wood flour heated in the presence of water at lower temperatures and pressures. All the samples were molded for 10 minutes under molding pressure of 2000 lb. per sq. in., at a molding temperature of 176° C.

its strength is concerned, but owing to the exceptional resistance of its surface to both cold water and boiling water, it may have some special commercial application.

Sample No. 3 is representative of a material with too much filler-effect relative to resin-effect as shown by its high water absorption and poor modulus of rupture wet. Sample No. 4 is representative of material having a ratio of filler-effect to resin-effect giving a desirable product, but not one of the most desirable. Sample No. 5 is representative of a material having too much resin-effect relative to filler-effect. This condition was produced by the low pH of the material during cooking. Sample No. 6 (untreated wood flour) is representative of a material with too high filler-effect, relative to resin-effect as shown by its low modulus of rupture wet and high water absorption.

The following examples illustrate test data for ligno-cellulose material heated in the presence of water at higher temperatures and pressures.

Molding the solid fines material above referred to with a water content of 4.0% in a confined mold at 2000 lb. per sq. in. for ten minutes at 176° C. (No. 4 in the first table hereinabove) gave a black piece with the following test values: Specific gravity 1.44, modulus of rupture dry, 7250, modulus of rupture wet, 7200, and water absorption 0.8%. This material represents substantially the optimum relation of filler-effect to resin-effect and the optimum amount of water plasticizer for this material.

The coarse fibre above referred to, without grinding, which is representative of a material having too high proportion of filler-effect to resin-effect for the purpose of this invention, when molded at 2000 lb. per sq. in. at 176° C. for ten minutes, gave a somewhat lighter colored piece than obtained with the solid fines, and having the following test values: Specific gravity 1.299, modulus of rupture dry, 10,530, modulus of rupture wet, 7010, and water absorption 47.3%. With this material, the low percentage of wet strength to dry strength indicates that the material is not suitable for making products of the invention.

| No. | Preparation data | | | | | Test data | | | |
| --- | --- | --- | --- | --- | --- | --- | --- | --- | --- |
| | Cooking time (hours) | Cooking pressure lb./sq. in. | Cooking temp. deg. C. | pH | Percent water in molding composition | Sp. gr. of product | Percent H$_2$O absorp. | Modulus of rupture | |
| | | | | | | | | Dry Lb./sq. in. | Wet Lb./sq. in. |
| 1 | 1½ | 120 | 176 | 4.2 | 6.5 | 1.4 | 5 | 7,290 | 6,700 |
| 2 | 6 | 120 | 176 | 4 | 6.4 | 1.35 | 3 | 4,700 | 2,000 |
| 3 | ¼ | 120 | 176 | 4.5 | 6.5 | 1.41 | 9 | 6,000 | 4,000 |
| 4 | 2 | atm. | 95 to 100 | 4.8 | 11 | 1.41 | 8 | 6,300 | 5,270 |
| 5 | 2 | atm. | 95 to 100 | 3.5 | 6.8 | 1.35 | 3 | 2,340 | 2,230 |
| 6 | Zero | | | 7.0 | 6.8 | 1.4 | 18 | 6,100 | 1,700 |

In the table above, Sample No. 1 represents a molding composition in which the resin effect and filler effect are so balanced as to give a desirable product within the invention. Sample No. 2 is representative of a material having an unduly high resin effect relative to filler effect. This is exhibited in the low modulus of rupture dry, and lower specific gravity and it has the low water absorption characteristic of a material having unduly high resin-effect relative to filler-effect. This material is not desirable as far as Another sample of the same material was ground in a rod mill to a fineness approximating that of the solid waste fines, and when molded at 2000 lb. per sq. in. at 176° C. for ten minutes gave a black piece having the following test values: Specific gravity 1.4, modulus of rupture dry, 8900, modulus of rupture wet, 6590, and water absorption 2.8%. This represents a material somewhat deficient in resin effect and of low percentage of wet strength to dry strength, but which may be useful for certain purposes.

The necessity and importance of restricting the conditions of the heat and water treatment within definite ranges of temperature, time and pH is shown in the examples cited. On the one hand Examples 2 and 5 of the second table show materials which are over-treated, yet the differences in the heat and water treatments were relatively slight, compare Examples 1 and 4. In one case it was a matter of time, and in the other a matter of pH. On the other hand, we can get products that are under-treated as shown by Examples 3 and 6 of the second table and by the unground and ground coarse fibre examples.

The unique character of this controlled heat and water treatment is further shown in that we can obtain a molding composition from a single material and in a single principal operation, exhibiting the properties connected with any molding composition having too much wood flour filler, namely, high dry strength, low wet strength and high water absorption, or exhibiting the properties connected with any molding composition having too much resin, namely, high water resistance, but low dry strength, besides being able also to get a product having these effects properly balanced.

It is to be understood that the specific figures and procedures herein set forth are for illustration only and for affording an understanding of the invention and the principles thereof, and that the invention is as broad as the appended claims.

We claim:

1. Process of making molded vitreous-like, highly dense products, which are very dark to black in color, from ligno-cellulose material, which consists in making application of high pressure steam, in a pressure chamber, to such material in such state of coarse subdivision that the steam can penetrate throughout the material, continuing such steam-treatment for such a short time as upon discharge will give relatively coarse tough fiber and solid fines having plastic flow under heat and pressure in the presence of a plasticizer, discharging the steam-treated material from said chamber into a region of lower pressure and thereby causing the material to be explosively disintegrated by the expansion of the steam therein into relatively coarse tough fiber and solid fines having plastic flow under heat and pressure in the presence of a plasticizer, separating said solid fines from the coarse fiber, adjusting the water content of the fines to about 1 to 11% to serve as a plasticizer in the molding operation, and molding the fines into the stated products under heat and pressure with retention of plasticizer.

2. The process as in claim 1 and wherein the plasticizer content is adjusted to about 3 to 6%.

3. The process as in claim 1, and wherein the water solubles are substantially washed out of the solid fines.

4. The process as in claim 1, and wherein the water solubles are substantially washed out of the solid fines and the plasticizer content adjusted to about 3 to 6%.

5. The process as in claim 1 and wherein the plasticizer comprises alcoholic material.

6. A highly dense, vitreous-like molded product, which is very dark to black in color, made from ligno-cellulose fines having plastic flow under heat and pressure in the presence of a plasticizer, which fines were obtained by subjecting subdivided ligno-cellulose material to steam at high pressure and temperature and explosively discharged to produce the fines, and which fines were washed to reduce the content of water solubles, and which washed fines with 1–11% of water plasticizer were molded under heat and pressure into the stated products.

7. Process of making highly dense, vitreous-like products, which are dark to black in color, from ligno-cellulose material, which consists in heat-treating subdivided ligno-cellulose material in the presence of water to a sufficient extent to effect a partial hydrolysis and thereby obtain ligno-cellulose material in a state having plastic flow under heat and pressure in the presence of a plasticizer, subjecting the partially hydrolized material to further subdivision to produce comminuted material for use in hot pressure molding, adjusting the water content of such comminuted material to about 1–11% to serve as a plasticizer in the molding operation, and molding the comminuted material into the stated product under heat and pressure with retention of plasticizer.

8. Process of making vitreous-like dense products which are dark to black in color from ligno-cellulose material which consists in heat treating subdivided ligno-cellulose material in the presence of water to a sufficient extent to effect a partial hydrolysis and thereby obtain ligno-cellulose material having the property of plastic flow under heat and pressure in the presence of a plasticizer, subjecting the partially hydrolyzed material to further subdivision to produce comminuted material for use in hot pressure molding, washing to reduce the content of water solubles, adjusting the water content of such comminuted material to about 1–11% to serve as a plasticizer in the molding operation, and molding the comminuted material into the stated products under heat and pressure with retention of plasticizer.

9. A highly dense vitreous-like molded product dark to black in color made from ligno-cellulose material having plastic flow under heat and pressure in the presence of a plasticizer, which material was obtained by heat-treating subdivided ligno-cellulose material in the presence of water to an extent to effect partial hydrolysis and thereby obtain ligno-cellulose having the property of plastic flow under heat and pressure in the presence of a plasticizer, and which treated material was thereafter molded into the stated product under heat and pressure with a water content of 1–11%, said product having a specific gravity over 1.35, and high wet and dry strength.

10. A highly dense, vitreous-like molded product, dark to black in color, made from ligno-cellulose material having the property of plastic flow under heat and pressure in the presence of a plasticizer, which material was obtained by heat-treating subdivided ligno-cellulose material in the presence of liquid water to an extent to effect partial hydrolysis and thereby obtain ligno-cellulose having the property of plastic flow under heat and pressure in the presence of a plasticizer, and subjecting the resulting material to mechanical subdivision and to washing to reduce the content of water solubles, and which subdivided washed material so produced was thereafter molded into the stated product under heat and pressure with a water plasticizer content of 1–11%, said product having a specific gravity over 1.35, high wet and dry strength, and water absorption not exceeding 8% upon 24 hours soaking.

11. Process of making, from ligno-cellulose, a material having the property of plastic flow under heat and pressure in the presence of a plasticizer, which consists in making application of high pressure steam, in a pressure chamber, to ligno-cellulose material in such state of coarse subdivision that the steam can penetrate throughout the material, continuing such steam-treatment for such a short time as upon discharge will give relatively coarse tough fiber and solid fines having plastic flow under heat and pressure in the presence of a plasticizer, discharging the steam-treated material from said chamber into a region of lower pressure and thereby causing the material to be explosively disintegrated by the expansion of the steam therein into relatively coarse tough fiber and solid fines having plastic flow under heat and pressure in the presence of a plasticizer, separating the solid fines from the coarse fiber, and adjusting the water content to about 1–11% to act as a plasticizer.

12. Molding material having the property of plastic flow under heat and pressure in the presence of a plasticizer which was obtained by subjecting subdivided ligno-cellulose material to steam at high pressure and temperature and explosively discharged and thereby reduced to fineness and the fines so produced were washed to reduce the content of water solubles, said material containing about 1–11% of plasticizer and being moldable under heat and pressure in the presence of the plasticizer into highly dense, vitreous-like products, which are very dark to black in color.

13. Process of making from ligno-cellulose a material having the property of plastic flow under heat and pressure in the presence of a plasticizer and thereby adapted for molding under heat and pressure, which comprises heat-treating subdivided ligno-cellulose material in the presence of water to such extent as to effect a partial hydrolysis and thereby obtain ligno-cellulose material having the property of plastic flow under heat and pressure in the presence of a plasticizer, and further subdividing the resulting material and adjusting the water content to about 1–11% to serve as a plasticizer to produce a material for use in heat and pressure molding operations.

14. Process of making from ligno-cellulose a material having the property of plastic flow under heat and pressure in the presence of a plasticizer and thereby adapted for molding under heat and pressure, which consists in heat treating subdivided ligno-cellulose material in the presence of water to such extent as to effect a partial hydrolysis and thereby obtain ligno-cellulose material having the property of plastic flow under heat and pressure in the presence of a plasticizer, and further subdividing the resulting material, washing said material to reduce the content of water solubles, and adjusting the water content to about 1 to 11% to serve as a plasticizer, thereby producing a material for use in heat and pressure molding operations.

15. Molding material made from ligno-cellulose and having plastic flow under heat and pressure in the presence of a plasticizer, which was obtained by subjecting subdivided ligno-cellulose material to heat-treatment in the presence of water to such extent as to effect a partial hydrolysis and thereby obtain ligno-cellulose material having the property of plastic flow under heat and pressure in the presence of a plasticizer, and washing to reduce the content of water solubles, such material containing about 1–11% of plasticizer and being moldable under heat and pressure into highly dense, vitreous-like products, which are very dark to black in color.

16. Process of making, from ligno-cellulose, a material having the property of plastic flow under heat and pressure in the presence of a plasticizer, which consists in making application of high pressure steam, in a pressure chamber, to ligno-cellulose material in such state of coarse subdivision that the steam can penetrate throughout the material, continuing such steam-treatment for such a short time as upon discharge will give relatively coarse tough fiber and solid fines having plastic flow under heat and pressure in the presence of a plasticizer, discharging the steam-treated material from said chamber into a region of lower pressure and thereby causing the material to be explosively disintegrated by the expansion of the steam therein into relatively coarse tough fiber and solid fines having the property of plastic flow under heat and pressure in the presence of a plasticizer, separating the solid fines from the coarse fiber, washing to reduce the content of water solubles, and adjusting the water content to about 1 to 11% to act as a plasticizer.

17. The process as in claim 16 and wherein the plasticizer comprises alcoholic material.

18. Molding material having the property of plastic flow under heat and pressure in the presence of a plasticizer which was obtained by subjecting subdivided ligno-cellulose material to steam at high pressure and temperature and explosively discharged and thereby reduced to fineness, said material containing about 1–11% of plasticizer, and being moldable under heat and pressure in the presence of the plasticizer into highly dense, vitreous-like products, which are very dark to black in color, with water absorption not to exceed 2% upon 24 hours' soaking.

19. Molding material made from ligno-cellulose and having plastic flow under heat and pressure in the presence of a plasticizer, which was obtained by subjecting subdivided ligno-cellulose material to heat-treatment in the presence of liquid water to such extent as to effect a partial hydrolysis and thereby obtain ligno-cellulose material having the property of plastic flow under heat and pressure in the presence of a plasticizer, such material containing about 1–11% of plasticizer and being moldable under heat and pressure into highly dense, vitreous-like products, which are dark to black in color, with water absorption not to exceed 8% upon 24 hours' soaking.

20. A highly dense vitreous-like molded product which is very dark to black in color, made from ligno-cellulose fines having plastic flow under heat and pressure in the presence of a plasticizer, which fines were obtained by subjecting subdivided ligno-cellulose material to steam at high pressure and temperature and explosively discharged to produce the fines, and which fines with about 1 to 11% of water plasticizer were molded under heat and pressure into the stated products.

21. The process as in claim 14 and wherein the plasticizer comprises alcoholic material.

22. The process as in claim 14, and wherein the plasticizer content is adjusted to about 4 to 8%.

23. Process of making vitreous-like, dense molded products from ligno-cellulose material, which products are dark to black in color, have specific gravity over 1.35 and water absorption not exceeding 8% upon 24 hours' soaking, which consists in heat-treating coarsely divided ligno-cellulose material in the presence of liquid water to a sufficient extent to effect a partial hydrolysis yielding heat-treated ligno-cellulose material having the property of plastic flow under heat and pressure in the presence of a plasticizer, subjecting the partially hydrolized material to mechanical subdivision to produce comminuted material for use in hot pressure molding, washing to reduce the content of water solubles, adjusting the water content of such comminuted material to about 1–11% to serve as a plasticizer in the molding operation, and molding the comminuted material into the stated products under heat and pressure.

24. Process of making from ligno-cellulose a material having the property of plastic flow under heat and pressure in the presence of a plasticizer and thereby adapted for molding under heat and pressure, which comprises heat-treating finely ground ligno-cellulose material in the presence of water to such extent as to effect a partial hydrolysis and thereby obtain ligno-cellulose material having the property of plastic flow under heat and pressure in the presence of a plasticizer, and adjusting the water content to about 1–11% to serve as a plasticizer to produce a material for use in heat and pressure molding operations.

GUY C. HOWARD.
LLOYD T. SANDBORN.

CERTIFICATE OF CORRECTION.

Patent No. 2,080,077.    May 11, 1937.

GUY C. HOWARD, ET AL.

It is hereby certified that error appears in the printed specification of the above numbered patent requiring correction as follows: Page 6, second column, lines 67 and 69, claims 21 and 22 respectively, for the reference numeral "14" read 13; and that the said Letters Patent should be read with these corrections therein that the same may conform to the record of the case in the Patent Office.

Signed and sealed this 29th day of June, A. D. 1937.

Henry Van Arsdale (Seal)    Acting Commissioner of Patents.

consists in heat-treating coarsely divided ligno-cellulose material in the presence of liquid water to a sufficient extent to effect a partial hydrolysis yielding heat-treated ligno-cellulose material having the property of plastic flow under heat and pressure in the presence of a plasticizer, subjecting the partially hydrolized material to mechanical subdivision to produce comminuted material for use in hot pressure molding, washing to reduce the content of water solubles, adjusting the water content of such comminuted material to about 1–11% to serve as a plasticizer in the molding operation, and molding the comminuted material into the stated products under heat and pressure.

24. Process of making from ligno-cellulose a material having the property of plastic flow under heat and pressure in the presence of a plasticizer and thereby adapted for molding under heat and pressure, which comprises heat-treating finely ground ligno-cellulose material in the presence of water to such extent as to effect a partial hydrolysis and thereby obtain ligno-cellulose material having the property of plastic flow under heat and pressure in the presence of a plasticizer, and adjusting the water content to about 1–11% to serve as a plasticizer to produce a material for use in heat and pressure molding operations.

GUY C. HOWARD.
LLOYD T. SANDBORN.

CERTIFICATE OF CORRECTION.

Patent No. 2,080,077. May 11, 1937.

GUY C. HOWARD, ET AL.

It is hereby certified that error appears in the printed specification of the above numbered patent requiring correction as follows: Page 6, second column, lines 67 and 69, claims 21 and 22 respectively, for the reference numeral "14" read 13; and that the said Letters Patent should be read with these corrections therein that the same may conform to the record of the case in the Patent Office.

Signed and sealed this 29th day of June, A. D. 1937.

Henry Van Arsdale (Seal) Acting Commissioner of Patents.

CERTIFICATE OF CORRECTION.

Patent No. 2,080,077. May 11, 1937.

GUY C. HOWARD, ET AL.

It is hereby certified that error appears in the printed specification of the above numbered patent requiring correction as follows: Page 6, second column, lines 67 and 69, claims 21 and 22 respectively, for the reference numeral "14" read 13; and that the said Letters Patent should be read with these corrections therein that the same may conform to the record of the case in the Patent Office.

Signed and sealed this 29th day of June, A. D. 1937.

Henry Van Arsdale (Seal) Acting Commissioner of Patents.